Patented May 27, 1947

2,421,142

UNITED STATES PATENT OFFICE 2,421,142

PROCESS FOR OBTAINING CRYSTALLINE RIBOFLAVIN

Julian K. Dale, Terre Haute, Ind., assignor to Commercial Solvents Corporation, Terre Haute, Ind., a corporation of Maryland No Drawing. Application April 5, 1944, Serial No. 529,679

6 Claims. (Cl. 260—211)

The present invention relates to a process for obtaining crystalline riboflavin. More particularly, it pertains to a method for securing crystalline riboflavin from precipitates produced by the reduction of that vitamin to a less soluble form.

Riboflavin has previously been isolated from many natural sources, such as liver, eggs, yeast and whey, as well as from certain fermented mashes such as, for example, the residues obtained from butyl alcohol fermentations. The methods previously employed by various investigators have, in general, been basically similar in principle. Ordinarily, the procedures consisted of first extracting the riboflavin-containing material with aqueous acid, alcohol, or with water-alcohol mixtures, followed by adsorption of the riboflavin contained in such extracts on a suitable adsorbent, such as fuller's earth, kieselguhr, kaolin, silica gel, hydrated aluminum silicate, etc. The riboflavin, thus adsorbed, was then recovered by eluting the resulting adsorbate with aqueous or slightly alcoholic mixtures containing alkaline compounds, such as ammonia, pyridine, sodium hydroxide, or diethylamine. The resulting eluate was concentrated and the riboflavin contained therein crystallized, after which it was further purified by solution and precipitated as the thallous or silver salt of riboflavin from which crystalline riboflavin could then be regenerated in a known manner.

While the above general methods might be considered relatively efficient in instances where small-scale operations are involved, it will readily be apparent that such methods would be highly impractical to utilize in connection with the isolation of riboflavin on a large scale, because of the comparatively high cost and questionable efficiency of the methods for recovering the various reagents employed.

I have now discovered that riboflavin can be obtained by treating with a suitable polar solvent, the precipitate obtained by the action of certain types of reducing bacteria on riboflavin solutions, or the precipitate produced by the action of certain chemical reducing agents on said solutions. Specifically, the precipitate of the kind first referred to is produced by fermenting a nutrient riboflavin-containing mash with bacteria, in accordance with the procedure described and claimed in U. S. Serial No. 435,418, by George E. Hines, Jr., filed March 19, 1942. This process consists of inoculating a riboflavin-containing nutrient mash at a predetermined pH with an active culture of bacteria capable of producing a precipitate from which riboflavin can subsequently be secured. Fermentation is permitted to continue until the separation of the precipitate is substantially complete. The precipitate thus obtained may be separated from the fermentation liquor in accordance with any convenient means, such as, for example, by decantation, centrifugation, or filtration. After isolation, the dried bacterial precipitate will ordinarily be found to assay from 60 to 90 per cent of a material which can be converted into riboflavin.

The precipitate obtained by the action of chemical reducing agents on riboflavin-containing solutions, is produced in accordance with either of the procedures set forth in copending applications U. S. Serial Nos. 488,903 and 488,904, filed May 28, 1943, by George E. Hines, Jr., and G. W. McMillan, respectively. The process described in these applications deals fundamentally with the use of a reducing agent capable of producing a measured potential in the riboflavin solution of between about —0.250 and —0.600 volt, as determined with the calomel half-cell at 22° C. Under these conditions, precipitation is effected by converting the dissolved riboflavin into a less soluble substance of unknown structure. This less soluble material, as produced in either of the two processes referred to immediately above, and also the substance contained in the precipitate produced by the action of bacteria in the manner indicated in copending application U. S. Serial No. 435,418, referred to above, are to be hereafter designated, for the purpose of convenience, as a riboflavin precursor.

This crude material, obtained as a precipitate and which I employ in carrying out my invention, is usually a reddish-brown product which, on being exposed to the atmosphere in a moist condition, assumes a dark green color on the surface thereof. In the case of precipitates obtained by the action of chemical reducing agents on riboflavin solutions, there is ordinarily found from about 20 to about 95 per cent inert material, depending on which of these two methods of chemical precipitation is utilized.

In regard to the dissimilarities between the aforesaid riboflavin precursor and riboflavin per se, there is much evidence to support the existence of such differences. The precipitate referred to, and which contains the riboflavin precursor, is formed by the action of either chemical reducing agents or certain types of reducing bacteria, on solutions which contain riboflavin dissolved therein. The very fact that the necessary reducing conditions must be present in the solution before the precipitate can be secured, is indicative, to say the least, that the dissolved riboflavin undergoes a chemical and not a physical transformation. Furthermore, the product thus obtained, and which is relatively insoluble in said solution under the reducing conditions provided therein, cannot be converted into riboflavin by dissolving the former in a solvent for said precursor, unless air or oxygen is present. Such precipitate, when examined microscopically, is seen to be amorphous, whereas riboflavin possess a well defined crystalline structure. In the absence of oxygen, the precipitate dissolves to produce a green solution from which no riboflavin precipitates, regardless of the length of time such solution is permitted to stand, or the cooling conditions to which it may be subjected. Riboflavin is only obtained by shaking the green solution, containing the dissolved riboflavin precursor, in the presence of air. By such treatment, the solution will be observed to turn from green to yellow and, on standing, yellow crystalline needles of riboflavin precipitate. The fact that the latter product can be obtained from the aforesaid green solution of riboflavin precursor, only in the presence of air, is further evidence that a chemical reaction is involved, i. e., oxidation, in the transformation of the precursor to riboflavin, and hence is likewise additional evidence that said precursor and riboflavin are different substances.

As further evidence of the dissimilar nature of riboflavin and said precursor, the following experimental data are included:

Experiment A

One-gram samples of a dried amorphous precursor precipitate were allowed to stand 24 hours at room temperature with 25 cc. of solvent. The appearance of the insoluble material through a microscope was then noted.

| Solvent | Microscopic Appearance After 24 Hours at Room Temperature |
|---|---|
| Methanol | Yellow crystalline conglomerates. |
| Ethanol | Clusters of yellow needles. |
| Isopropanol | Do. |
| Water | Very small cryst. yellow conglomerates. |
| Acetone | Clusters of yellow needles. |
| Ethyl acetate | Matted yellow needles. |

Experiment B

A 250 mg. sample of a dried precipitate containing 72.5% riboflavin precursor was shaken with 250 ml. of water. A portion was removed, filtered, and assayed at intervals. The following table shows the concentration of riboflavin in the solution at the end of these time intervals.

| Time | Conc. of Riboflavin in Solution |
|---|---|
| | G./l. |
| After 3 min | 0.55 |
| After 10 min | 0.45 |
| After 20 min | 0.47 |
| After 2 hrs | 0.30 |
| After 24 hrs | 0.25 |
| After 48 hrs | 0.23 |

The solubility of crystalline riboflavin is 0.12 gram per liter. Hence the initial concentration obtained by shaking the precursor with water is 4½ times as great as is obtained by shaking riboflavin with water. Furthermore the concentration of riboflavin in solution decreases with time. This is due to the fact that the precursor dissolving in water is converted into riboflavin, giving a highly supersaturated solution of riboflavin which slowly crystallizes, thus reducing the concentration of dissolved riboflavin. As will be noted, the concentration is approaching that of 0.12 gram per liter, which is the solubility of riboflavin.

Experiment C

The solubility of riboflavin crystals was determined by refluxing an excess of the compound, filtering, then allowing the filtrate to crystallize. After crystallization the crystals were filtered out and weighed. The volume of the filtrate was measured and assayed. The weight of the crystals plus the riboflavin in the filtrate is a measure of the amount of riboflavin dissolved by the hot solvent. The solubility of the precursor was determined in the same manner.

| Solvent | Solubility at Reflex Temp., g./l. | |
|---|---|---|
| | Crystalline riboflavin | Precursor [1] |
| Water | 1.6 | 4+ to 9.75 |
| 50% Isopropyl alcohol | 2.5 | 4+ to 8.45 |
| 75% Isopropyl alcohol | 1.6 | 3.5 to 8.0 |
| 50% Methanol | 1.5 | 4+ to 5.5 |
| 50% Ethanol | 2.5 | 4+ to 7.6 |
| 50% Acetone | 0.9 | 3+ to 4 |

[1] The wide variation in the solubility of the precursor is due to the fact that frequently, even at reflux temperature, the precursor is converted to crystalline riboflavin which separates and is filtered out with the insoluble portion of the precursor and hence does not appear in the filtrate. However, even the lowest figures show that the precursor, as such, has a greater solubility than crystalline riboflavin and so must be a different compound.

The fact that I am able to secure crystalline riboflavin from a crude precipitate containing a constituent of unknown structure and composition, which can be converted into riboflavin, is considered indeed surprising. Whatever the nature of this constituent might be, its solubility in the solvents utilized under the conditions encountered in my process, is greater than that of riboflavin. However, on solution, in the presence of oxygen, this more soluble component, as indicated above, undergoes some chemical change whereby it is transformed into riboflavin, which is less soluble in the aforesaid solvents. In connection with the crude precipitate employed in my process, it is to be specifically understood that this material can be obtained in accordance with one or more of the processes briefly referred to above, i. e., U. S. Serial No. 435,418, or U. S. Serial Nos. 488,903 and 488,904.

An additional and novel feature of the present invention constitutes the fact that the precipitate from which I am able to obtain pure crystalline riboflavin, has never before been utilized for such purpose. From this precipitate it is possible to recover as much as 75 per cent of its weight of crystalline riboflavin as compared to amounts of less than 1 per cent from the richest previously-known source of that vitamin.

In practicing my invention, the crude reddish-brown precipitate, either in a wet or dry condition, is placed in a solvent capable of dissolving the riboflavin precursor present therein. The resulting mixture is then preferably heated to aid in the solution of the crude product, and upon such treatment the precipitate is substantially completely dissolved, with the exception of the inert material present therein. The latter may be readily removed from the hot solution by filtration, or any other convenient means. The clear solution, thus obtained, on cooling, yields yellow needle-like crystals of riboflavin, which may be readily separated from the mother liquor by filtration or centrifugation. Frequently crystalline riboflavin is observed to precipitate while the solution is still hot.

The polar solvents employed in carrying out my process may be any of a large number of liquids in which the riboflavin precursor, present in the crude material, is soluble to such an extent that the solubility product of the riboflavin, resulting from the transformation of the said dissolved precursor into riboflavin, is exceeded. In regard to the solvent used, it will ordinarily be found preferable to employ one capable of dissolving the riboflavin precursor to an appreciable extent. Satisfactory results, however, may also be obtained with solvents which dissolve that component only to a slight extent. With solvents of the latter type, it will be manifest that conditions may be encountered wherein riboflavin and the riboflavin precursor are both present simultaneously in the solid phase. However, because of the fact that the latter is the more soluble of the two substances, the proportions thereof in the solid phase will be observed to diminish until a point is reached whereby substantially all of the precursor has passed into solution, and is subsequently transformed into riboflavin which, being practically insoluble in such solvents, precipitates in the form of yellow crystals. In general, it may be said that any polar solvent in which the said precursor is more soluble than riboflavin itself, will be found to be operative in my process. As examples of solvents possessing the above-mentioned properties, there may be mentioned the lower aliphatic alcohols, and aqueous solutions thereof; the lower glycols; the lower ketones, the lower aliphatic esters, the lower glycol ethers, including the methyl, ethyl, propyl and butyl ethers of ethylene glycol; the methyl and ethyl ethers of diethylene glycol, and the like.

The proportion of solvent to precipitate employed in obtaining riboflavin in accordance with my process, is not critical. However, in order to recover riboflavin in consistently high yields, it will be found that the volume of solvent required will vary widely, depending upon the particular type of solvent employed, and the concentration of precursor in the crude precipitate.

Likewise, the temperature at which my process can be carried out, is not critical, and I have obtained highly satisfactory results at temperatures ranging from about 25° C. to approximately the boiling point of the particular solvent utilized.

The data appearing below in tabular form illustrate typical solvents that may be employed, as well as the effect of varying the concentration of water on the efficiency of certain of the solvents listed. In carrying out the experiment, from which the data appearing below in Table I, were obtained, aliquot samples of a wet crude precipitate, produced by the action of chemical reducing agents on a riboflavin solution and containing 4.44 per cent riboflavin precursor, were added to a specified volume of solvent, and the resulting mixture heated at or slightly below the boiling point of the solvent, until substantial solution of the soluble material in the precipitate, was obtained. At this stage, the hot mixture was filtered and the undissolved impurities, originally present in the crude precipitate, separated therefrom. On cooling, characteristic yellow needles of riboflavin were formed. The crystalline riboflavin, thus obtained, was separated from the mother liquor by filtration, washed, dried and weighed. The riboflavin, remaining in the filtrate, was also determined fluorometrically or microbiologically. The unextracted riboflavin was determined by difference.

*Table I*

| Solvent | Vol. of Solvent (ml.) used per 56.4 gr. of precipitate | Yield Crystalline Riboflavin, per cent | Riboflavin left in Filtrate, per cent | Total Riboflavin Extracted, per cent | Unextracted Riboflavin Precursor, per cent |
|---|---|---|---|---|---|
| Water | 625 | 85.0 | 14.4 | 99.4 | 0.6 |
| Methanol | 625 | 12.4 | 12.4 | 24.8 | 75.2 |
| Absolute ethanol | 625 | 10.4 | 4.8 | 15.6 | 84.4 |
| Butanol | 625 | 22.8 | 3.2 | 26.0 | 74.0 |
| 91% Isopropyl alcohol | 625 | 35.3 | 7.6 | 42.9 | 57.1 |
| 75% Isopropyl alcohol | 500 | 81.0 | 12.4 | 93.4 | 6.6 |
| 68% Isopropyl alcohol | 625 | 80.0 | 20.0 | 100.0 | 0.0 |
| 75% Methanol | 625 | 74.0 | 26.0 | 100.0 | 0.0 |
| 75% Ethanol | 625 | 72.0 | 21.5 | 93.5 | 6.5 |
| 75% Acetone | 625 | 40.0 | 24.0 | 64.0 | 36.0 |
| Carbitol | 310 | 65.2 | 15.6 | 81.8 | 18.2 |
| Methyl cellosolve | 625 | 82.2 | 13.6 | 95.8 | 4.2 |
| Ethylene glycol | 310 | 81.5 | 11.6 | 93.2 | 6.8 |
| 2-Methyl-2, 4-pentanediol | 310 | 27.6 | 5.2 | 32.2 | 67.8 |

The data incorporated in the table below were secured in accordance with substantially the same procedure as outlined above. The precipitate, utilized in this second series of experiments, however, was produced by bacteria.

*Table II*

| Solvent | Volume of Solvent employed per 10 gr. of Precipitate; ml. | Precursor Present in Precipitate | Precipitate Undissolved | Precursor Obtained as Riboflavin |
|---|---|---|---|---|
| Water | 1,000 | 60 | 6 | 75 |
| Methanol | 2,000 | 60 | 66 | 30 |
| Ethanol | 2,000 | 60 | 77 | 20 |
| Propanol | 2,000 | 60 | 72 | 33 |
| Isopropanol | 2,000 | 60 | 68 | 30 |
| Butanol | 2,000 | 60 | 72 | 33 |
| 50% Methanol | 1,000 | 60 | 15 | 72 |
| 12½% Methanol | 1,200 | 75 | 8 | 74 |
| 65% Ethanol | 1,500 | 62 | 8 | 83 |
| 50% Ethanol | 1,000 | 60 | 10 | 80 |
| 75% Isopropanol | 1,500 | 62 | 23 | 73 |
| 50% Isopropanol | 1,000 | 60 | 10 | 75 |
| Propylene glycol | 1,000 | 75 | 9 | 74 |
| Carbitol | 1,000 | 75 | 8 | 92 |
| Methyl carbitol | 1,000 | 75 | 4 | 92 |
| Methyl cellosolve | 1,000 | 75 | 48 | 34 |
| 5% Acetic Acid | 1,000 | 75 | 11 | 60 |
| 75% Acetone | 1,500 | 62 | 29 | 54 |
| Ethylene glycol | 300 | 35 | 47 | 89 |
| 2-Methyl-2, 4-pentanediol | 900 | 35 | 51 | 97 |

The foregoing data are given merely to illustrate several of the many solvents that may be utilized in carrying out my invention, and are not to be at all construed as limiting the scope thereof. In its fundamental aspects, the present invention constitutes the discovery that a riboflavin precursor of unknown structure and composition, present in the precipitate produced by the action of a chemical reducing agent on a riboflavin-containing solution, or by the action of reducing bacteria on a nutrient riboflavin solution, may be transformed into the substance known as riboflavin by dissolving the former in a suitable solvent, whereby said precursor undergoes some chemical change to yield riboflavin.

This is a continuation-in-part of my application U. S. Serial No. 435,841, filed March 23, 1942.

Having now described my invention, what I claim is:

1. In the manufacture of crystalline riboflavin, the process which comprises treating with a polar solvent an amorphous reddish-brown reduction product of riboflavin, which has the property of dissolving in water and other polar solvents in the absence of air to form a green solution turning yellow upon oxidation due to the conversion of said reduction product into riboflavin; said polar solvent being of a type in which said reduction product is more soluble than riboflavin under oxidizing conditions and being selected from a class consisting of water, the lower aliphatic alcohols and aqueous solutions thereof, the lower ketones and aqueous solutions thereof, the lower glycols, the lower aliphatic esters and the lower glycol-ethers; subjecting the resulting solution to oxidizing conditions to form a supersaturated solution of riboflavin and causing the latter to crystallize out of said solution.

2. In the manufacture of crystalline riboflavin, the process which comprises treating with a polar solvent an amorphous reddish-brown reduction product of riboflavin having the property of dissolving in water and other polar solvents in the absence of air to form a green solution which solution turns yellow upon oxidation due to the conversion of said reduction product into riboflavin; said polar solvent being of a type in which said reduction product is more soluble than riboflavin under oxidizing conditions and being selected from a class consisting of water, the lower aliphatic alcohols and aqueous solutions thereof, the lower ketones and aqueous solutions thereof, the lower glycols, the lower aliphatic esters and the lower glycol-ethers; said reduction product being treated with said solvent under oxidizing conditions producing a supersaturated solution of riboflavin, and recovering crystallized riboflavin from said solution.

3. In the manufacture of crystalline riboflavin, the process which comprises forming a hot substantially saturated solution in a polar solvent of an amorphous reddish-brown reduction product of riboflavin, which has the property of dissolving in water and other polar solvents in the absence of air to form a green solution turning yellow upon oxidation due to the conversion of said reduction product into riboflavin; said polar solvent being of a type in which said reduction product is more soluble than riboflavin under oxidizing conditions and being selected from a class consisting of water, the lower aliphatic alcohols and aqueous solutions thereof, the lower ketones and aqueous solutions thereof, the lower glycols, the lower aliphatic esters and the lower glycol-ethers; removing any insoluble matter from the solution, subjecting said solution to oxidizing conditions to form a supersaturated solution of riboflavin and causing the latter to crystallize from said solution.

4. The process of claim 1 wherein said polar solvent is an aqueous solution of methanol.

5. The process of claim 1 wherein said polar solvent is ethylene glycol.

6. The process of claim 1 wherein said polar solvent is an aqueous solution of isopropyl alcohol.

JULIAN K. DALE.

REFERENCES CITED

The following references are of record in the file of this patent:

UNITED STATES PATENTS

| Number | Name | Date |
|---|---|---|
| 2,202,161 | Miner | May 28, 1940 |
| 2,367,646 | McMillan | Jan. 16, 1945 |

OTHER REFERENCES

Greene et al., Jour. Amer. Chem. Soc., 1937, pages 1820–1822.